R. HEYDEMANN & A. KLINKMANN.
POTATO-DIGGER.
No. 171,224.  Patented Dec. 21, 1875.
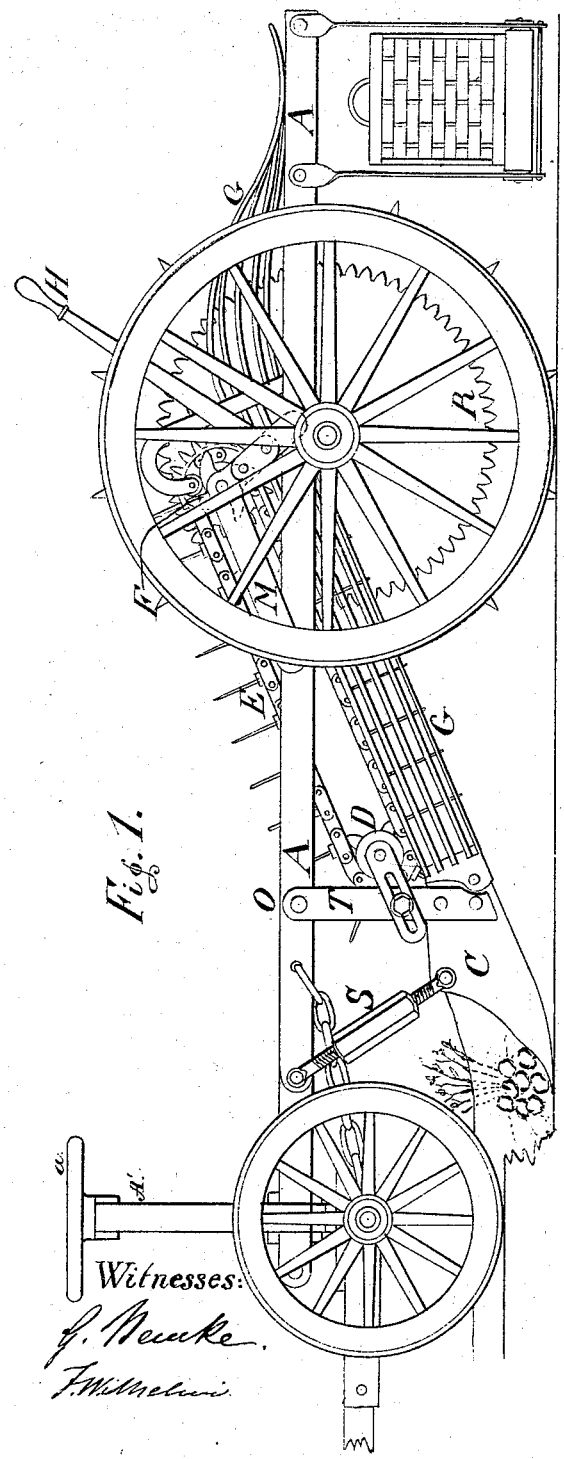
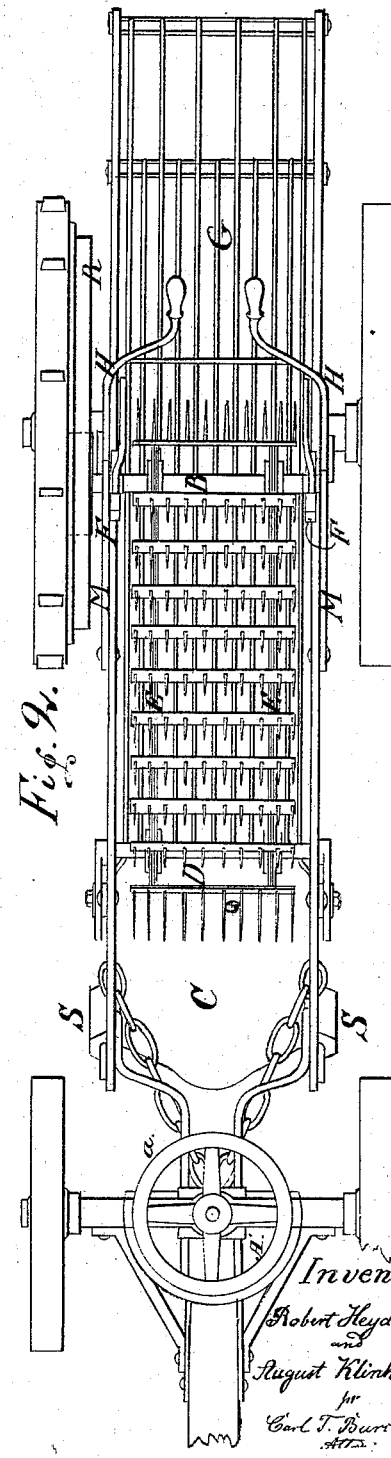

UNITED STATES PATENT OFFICE.

ROBERT HEYDEMANN, OF KREBSOW, AND AUGUST KLINKMANN, OF GREIFSWALDE, PRUSSIA.

IMPROVEMENT IN POTATO-DIGGERS.

Specification forming part of Letters Patent No. 171,224, dated December 21, 1875; application filed October 2, 1875.

*To all whom it may concern:*

Be it known that we, ROBERT HEYDEMANN, of Krebsow, in the Kingdom of Prussia, German Empire, and AUGUST KLINKMANN, of Greifswald, in the Kingdom of Prussia, German Empire, have invented certain Improvements in Potato-Digging Machines; and we do hereby declare that the following is a full, clear, and exact description thereof, which will enable those skilled in the art to make and use the same, reference being had to the accompanying drawing making part of this specification.

Our invention applies to that class of potato-diggers which automatically take up the hill or row containing the potatoes, separate the earth from the potatoes, and deliver the latter into suitable receptacles; and relates to the adjustment of the plow, and the easy manipulation of the machine.

Figure 1 is a side view, and Fig. 2 is a plan, of the machine.

A is a frame mounted on four wheels, two of which form, with its axle, the front steering-truck, which is connected with the frame by two chains. Of the two others—the rear wheels—one serves as a running, the other as a driving, wheel, an inside toothed ring, R, gearing with a pinion on the end of the main or driving shaft B, being fixed to it. Supported by two swinging bars, T T, and two screw-trusses, S S, a plow, C, is attached to the frame A. The swinging bars T T are riveted on one end to the plow C; the other end is hinged to the frame A at O. The screw-trusses S S in front of T T may be lengthened or shortened by turning their long connecting-nuts, whereby the whole plow may be swung around O, and the front point of it raised or depressed. Fixed adjustably to the bars T T are the bearings of the shaft D. On this shaft D, as on the main shaft B, are mounted on each two chain-wheels, round which run two endless chains, E E, connected by a series of cross-bars, armed with fingers or spikes, to a chain elevator. On the shaft B are also fixed two shaking-wheels, F F, shaking up through two rods the separator G, of wooden or iron lath-work, which is hinged with the front end to the rear part of the plow C.

The before-mentioned fingers or spikes arranged in the intervals of the separator-bars are long enough to reach through the openings of the same.

By means of the hand-levers H H, the shorter arms of which are parts of toggle-joints, which are connected to one end of the bars M M, serving as bearings for the shaft B, this shaft B may be raised or lowered, and in this way the pinion on the end of shaft B is thrown into or out of gear with the large toothed ring-wheel R.

On the extreme rear end of the frame A is suspended a platform, to admit a basket or other receptacle, in which the potatoes are deposited after leaving the separator, the bars of which have on this point double the distance from each other, so that the potatoes fall through the openings. The extreme front end of the frame A rests on a nut, sliding in a vertical guide-frame, A', and is moved up and down by a hand-wheel, $a$, and a screw turning in the nut. The lower part of this screw forms the king-bolt.

After having let down the frame A to the desired depth, the plow is adjusted by turning the long nut of the screw-trusses S S, the chain elevator by regulating the bearings of the shaft D, and the pinion on shaft B is thrown into gear with the ring-wheel R.

The machine being drawn forward, the plow C is forced under the hill. The earth containing the potatoes will slide over the plow C, and up along the lath-work. Now, and just below the shaft D, this body of earth is seized by the fingers or spikes of the chain elevator and separated. The potatoes are carried up to the highest point of the separator, from where they roll into the basket, while the earth escapes through the openings of the separator, which latter process is assisted by the up-and-down shaking of the separator.

After having finished work, the front end of the frame A is lifted up by means of the hand-wheel $a$ and screw till the plow C clears the ground. The shaft B is thrown out of gear by depressing the hand-levers H H, and the machine is now ready to be removed to any other place.

The first object of our invention is to make the plow of a potato-digger adjustable in relation not only to the depth but to the best direction or angle in which to work, without interfering with the working of the other mechanism, which is attached to the plow. The second is to disengage a potato-digger in the quickest and most convenient manner for transportation on the road.

What we claim as new, and desire to secure by Letters Patent, is—

1. The swinging plow of a potato-digging machine, steadied through adjustable screw-trusses, in combination with an up-and-down shaking separator, E G, hinged to the plow, and with the adjustable bearings of a chain elevator, in the manner set forth.

2. The combination, with the frame A, of the elevating frame and screw A', the levers H H, and shaft B, as and for the purpose specified.

In testimony whereof we have signed our names to this specification in the presence of two subscribing witnesses.

ROBERT HEYDEMANN.
AUGUST KLINKMANN.

Witnesses:
WENSESLAUS NAWROELIES,
HERMANN KREISMANN.